(12) United States Patent
Badouin

(10) Patent No.: US 11,829,957 B2
(45) Date of Patent: Nov. 28, 2023

(54) METHOD FOR PROVIDING A MOTOR VEHICLE FOR A SERVICE AND SERVICE ENVIRONMENT

(71) Applicant: AUDI AG, Ingolstadt (DE)

(72) Inventor: David Alexander Badouin, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 584 days.

(21) Appl. No.: 16/969,463

(22) PCT Filed: Oct. 23, 2018

(86) PCT No.: PCT/EP2018/079022
§ 371 (c)(1),
(2) Date: Aug. 12, 2020

(87) PCT Pub. No.: WO2019/158232
PCT Pub. Date: Aug. 22, 2019

(65) Prior Publication Data
US 2021/0056517 A1 Feb. 25, 2021

(30) Foreign Application Priority Data
Feb. 19, 2018 (DE) .................. 10 2018 202 481.2

(51) Int. Cl.
*G06Q 10/20* (2023.01)
*B60W 30/06* (2006.01)
(Continued)

(52) U.S. Cl.
CPC ............. *G06Q 10/20* (2013.01); *B60W 30/06* (2013.01); *G06V 20/52* (2022.01); *G07C 9/10* (2020.01); *G08G 1/149* (2013.01); *H04W 12/06* (2013.01)

(58) Field of Classification Search
None
See application file for complete search history.

(56) References Cited

U.S. PATENT DOCUMENTS 10,140,793 B2   11/2018   Nordbruch et al.
10,509,405 B2   12/2019   Nordbruch
(Continued)

FOREIGN PATENT DOCUMENTS

DE   102011088809 A1   6/2013
DE   102012224149 A1   6/2014
(Continued)

OTHER PUBLICATIONS

English Translation of JP 2015219811A (Year: 2015).*
(Continued)

*Primary Examiner* — Thomas E Worden
(74) *Attorney, Agent, or Firm* — Sterne, Kessler, Goldstein Fox P.L.L.C.

(57) ABSTRACT

The present disclosure relates to a method for providing a motor vehicle for a service, said motor vehicle having a vehicle guidance system designed for fully automated vehicle guidance and being parked in a parking space in a parking environment, in particular which is blocked for people. The method includes providing a service space outside the parking environment, which has a parking-environment-side access gate and a staff access that can be accessed from outside the parking environment. The method includes completely automatically driving the motor vehicle through the vehicle guidance system from the parking space via the parking environment into the service space without any people in it, and parking the motor vehicle in the service space, and after parking the motor vehicle in the service space, closing the access gate and enabling an entry of a service person through the staff access depending on an
(Continued)

authentication process carried out by the service person at an authentication device located outside the service space.

12 Claims, 2 Drawing Sheets

(51) Int. Cl.
  *G08G 1/14* (2006.01)
  *H04W 12/06* (2021.01)
  *G06V 20/52* (2022.01)
  *G07C 9/10* (2020.01)

(56) References Cited

U.S. PATENT DOCUMENTS

| | | |
|---|---|---|
| 2015/0345965 A1 | 12/2015 | Semsey |
| 2017/0323565 A1 | 11/2017 | Nordbruch et al. |
| 2017/0330399 A1* | 11/2017 | Nordbruch .............. B60R 25/31 |
| 2018/0261017 A1 | 9/2018 | Kim |
| 2020/0198489 A1* | 6/2020 | Yoon ...................... B60L 58/12 |
| 2020/0198620 A1* | 6/2020 | Nakata ............. B60W 60/0053 |

FOREIGN PATENT DOCUMENTS

| | | |
|---|---|---|
| DE | 102014224106 A1 | 6/2016 |
| DE | 102014224113 A1 | 6/2016 |
| DE | 102015208062 A1 | 11/2016 |
| JP | 2002326571 A | 11/2002 |
| JP | 2015219811 A * | 12/2015 |
| WO | WO 2016/186379 A1 | 11/2016 |

OTHER PUBLICATIONS

International Search Report and Written Opinion of the International Searching Authority directed to related International Patent Application No. PCT/EP2018/079022, dated Feb. 12, 2019, with attached English-language translation; 18 pages.
International Preliminary Report on Patentability directed to related International Patent Application No. PCT/EP2018/079022, dated Aug. 27, 2020, with attached English-language translation; 14 pages.

* cited by examiner

METHOD FOR PROVIDING A MOTOR VEHICLE FOR A SERVICE AND SERVICE ENVIRONMENT

TECHNICAL FIELD

The present disclosure relates to a method for providing a motor vehicle for a service, said motor vehicle having a vehicle guidance system designed for fully automated vehicle guidance and being parked in a parking space in a parking environment, which is, in particular, blocked for people. The present disclosure also relates to a service environment.

BACKGROUND

Parking environments, for example parking spaces having a plurality of parking spaces and parking garages, are already known in the prior art, in which motor vehicles can enter and leave the parking space autonomously; i.e., in a fully automated manner. This concept is also called "Autonomous Valet Parking." In this case, the corresponding motor vehicle can be parked in a transfer region of the parking environment and correspondingly can be registered with a control device of the parking environment, which transmits control information to the motor vehicle, so that it can take up a parking space assigned to it in a fully automated manner. Similarly, it is possible to call the motor vehicle back into the transfer region or into another transfer region. Since the parking operation in such parking environments is preferably carried out completely without a driver, it is also known to design such parking environments without any people in it, which means blocking access to the parking environment for people in order to be able to meet the highest possible safety standards.

Various concepts are already known in the prior art for providing services for parked motor vehicles, for example also for motor vehicles parked in a parking environment. Such services can include, for example, interior cleaning, exterior cleaning, refueling of the motor vehicle, charging a battery of the motor vehicle, and delivering mail items to the motor vehicle.

DE 10 2014 224 113 A1 describes a parking space management server for a parking space, wherein, in response to a request for performing a vehicle-specific service for a vehicle in the parking lot, it is checked whether or not the requested or queried service can be carried out in accordance with the request. If the service can be carried out, it is provided that it is planned and coordinated automatically. In particular, in the case of a service that can be carried out in the parking space, this can also be carried out automatically as part of an automatic parking process of the vehicle. The services or vehicle-specific services should therefore be carried out while the vehicle is in the parking space.

DE 10 2011 088 809 A1 relates to a method for requesting guidance information on a parking opportunity offering a charging opportunity for charging an electric vehicle. An additional requirement can also be used, which can be, for example, a maintenance interval due, a cleaning requirement, or the like. At parking opportunities—i.e., parking spaces—in addition to a charging opportunity, further devices can be provided to satisfy a further special requirement, for example washing devices or maintenance devices.

DE 10 2012 224 149 A1 relates to a system for parking time management, which allows a selective opening of the motor vehicle, in particular depending on an authorization. For example, the bonnet, vehicle doors, and/or fuel filler flaps can be opened in a parked motor vehicle. Service can thus be carried out on site in a parking garage in which the motor vehicle is parked.

In many known prior art parking environments that use autonomous valet parking (AVP), the public must be excluded from the AVP parking environment for legal and/or security reasons. Thus, people who are supposed to provide a service cannot get to a parked motor vehicle. Furthermore, when people are allowed in a parking environment, there is the problem that possibly unauthorized people can gain access to or damage a motor vehicle, in particular also when the service is provided.

BRIEF DESCRIPTION OF DRAWINGS/FIGURES

DETAILED DESCRIPTION

Figure 1:
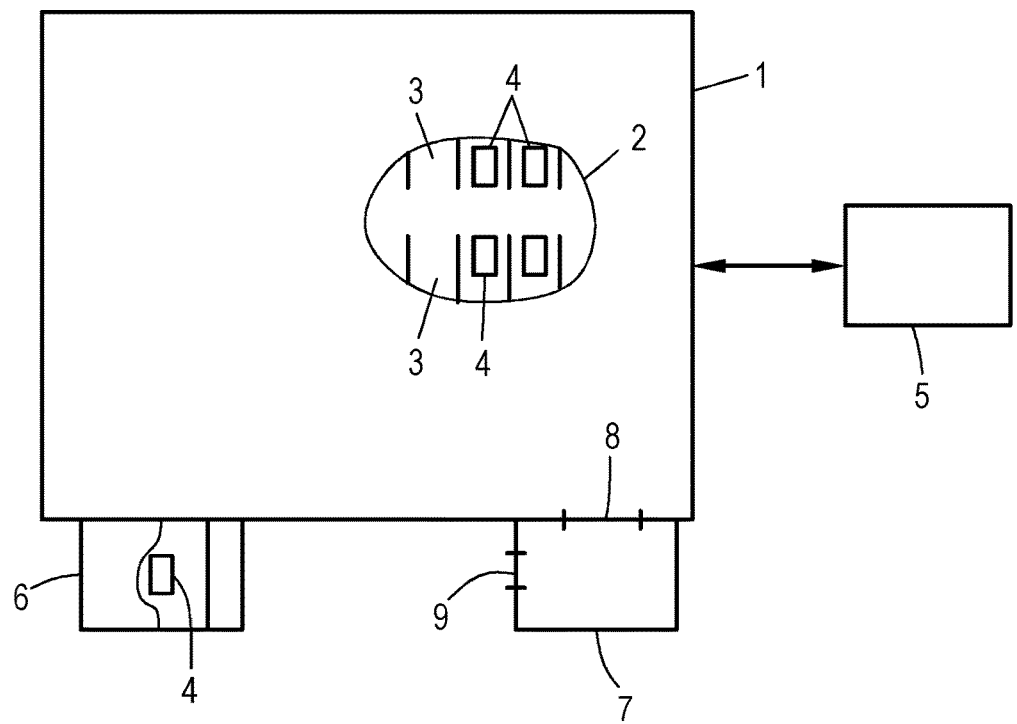
FIG. 1 illustrates a schematic diagram of a parking environment with a service environment, in accordance with some embodiments.

The present disclosure is therefore based on the object of providing an improved way of providing a service on a motor vehicle parked in a parking environment.

A method according to some embodiments, as described herein, is of the type mentioned at the outset, which is provided for solving this problem. The method is characterized by the following steps:

providing a service space outside the parking environment, which has a parking-environment-side access gate and a staff access that can be accessed from outside the parking environment, completely automatically driving the motor vehicle through the vehicle guidance system from the parking space via the parking environment into the service space without any people in it, and parking the motor vehicle in the service space, after parking the motor vehicle in the service space, closing the access gate and enabling an entry of a service person through the staff access depending on an authentication process carried out by the service person at an authentication device located outside the service space.

In some embodiments, the service space can therefore also be understood as a service lock, which not only avoids that service personnel have to enter the parking environment, where motor vehicles are operated autonomously, but also that the motor vehicle is first parked in a service space located outside the parking environment before the service personnel is also given access to the service space, again with the entrance gate closed, in order to prevent the service personnel from entering the parking environment. The entry of the motor vehicle through the entrance gate therefore takes place with closed staff access, and consequently a service space without any people in it, so that there is no danger at this time.

In some embodiments, by way of a non-limiting example, the same can be done after the completion of the service, so that it can be provided that, after completing the service, the following steps may be performed:

detecting a service person leaving the service space takes place, in particular by means of a deregistration process at the authentication device, after detecting a service person leaving the service space and closing the staff access, the motor vehicle is driven in a fully automated manner by means of the vehicle guidance system through the access gate and the parking environment onto the parking space or another parking space of the parking environment.

In some embodiments, the deregistration process can therefore include a further authentication process of the service person at the authentication device, and consequently outside the service space. The use of the authentication device, which is located outside the service space, therefore makes it clear that the service person is no longer in the service space. The staff access can be locked, the entrance gate can be opened and the motor vehicle can drive back to its parking space or to a new parking space in the parking environment.

In some embodiments, the location of the provision of the service is spatially separated from the parking environment and it is avoided that people have to enter the parking environment, for example a parking garage, which is closed to people. Staff access is only opened to people after the motor vehicle has entered autonomously and the entrance gate is closed again. In addition, an authentication process is required so that unauthorized persons cannot come into contact with the motor vehicle if possible. Accordingly, only selected people can get to the motor vehicle. The motor vehicle is only put back into autonomous operation when the service person has left the service space and the staff access, for example comprising an access door, has been closed. In addition or as part of the detection that the service person has left the service space, a further operating action on the authentication device, which acts as a front end, can be requested. By way of a non-limiting example, a detection that the service person has left the service space can also be carried out via sensors of the service space, for example a camera, and/or the staff access.

In some embodiments, it can be provided for the motor vehicle to be blocked for fully automated operation during parking in the service space. In this way it can be ensured that the service person can enter the service space safely. The autonomous driving permission is only granted to the motor vehicle again when the service person has left the service space and the staff access has been closed.

In some embodiments, use is made in particular of the fact that a central control device is already assigned to the parking environment, which can be designed as a parking space or, in particular, a parking garage and advantageously realizes an autonomous valet parking (AVP), and the central control device communicates with the motor vehicles within the parking environment and can transmit control information in order to coordinate the autonomous—i.e., fully automated—operation of the motor vehicles in the parking environment. The control information, which may include, for example, a digital map of the navigation environment and/or a target position, and/or a time window for driving through specific sections, is evaluated by the vehicle guidance system of the motor vehicle receiving the control information and converted into a corresponding fully automated guidance of the motor vehicle.

In some embodiments, a control device of the parking environment communicating with the motor vehicles parked in the parking environment can be used to coordinate the use of the service space. This means that the functionality of the control device that already coordinates the operation in the parking environment is expanded accordingly, for example to assign dates for services to motor vehicles and to send the corresponding control information to the vehicles so that they can be moved at the right time from their parking space into the service space or vice versa. The authentication device also communicates with the control device, so that the corresponding information determined there can also be processed further.

In some embodiments, the use of the central control device makes it possible to withdraw the autonomous driving permission from a motor vehicle parked in the service space in a simple manner, and therefore to block it for fully automated operation by sending corresponding control information to the motor vehicle. The motor vehicle can confirm the blocking of the fully automated operation to the control device, with access for service personnel only being permitted after this confirmation has been received in order to increase security.

It should be noted that options for coordinating the operation of motor vehicles in autonomous valet parking have already been proposed in large amounts in the prior art, so that they do not have to be explained in more detail here. Rather, the additional provision of the service space fits particularly easily into such existing concepts, which already allow the motor vehicle to be transferred to the transfer region or from the transfer region. Transfer regions of this type, at which the motor vehicle is parked in order to then park in a fully automated manner in the parking environment, or to which the motor vehicle is parked again autonomously after a corresponding reclaim, are usually also outside the parking environment itself, which, as explained, is in any case preferably blocked for people.

By way of a non-limiting example, the procedure according to some embodiments, as described herein, may also be expediently implemented in parking environments with mixed traffic (autonomous and manually operated motor vehicles/people) since the controlling of who and when a person gains access to a motor vehicle is expedient in this case as well.

In some embodiments, in parking environments that are blocked for people as well as in parking environments with mixed traffic, it is expedient if a service space is used with at least one service device that can be used to perform the service. For example, the at least one service device can comprise a charging station and/or a fuel dispenser for refueling the motor vehicle and/or a water connection and/or a vacuum cleaner. The service space can therefore have special equipment to perform the service. In particular, various service devices are to be provided in order to provide different services in a common service space, for example refueling, charging a vehicle battery, interior cleaning, exterior cleaning, mail delivery, maintenance, and the like.

In some embodiments, the method provides that, depending on the service, at least one door and/or at least one connection of the motor vehicle is unlocked during the parking thereof. For example, control information transmitted from the control device to the motor vehicle can include the corresponding unlocking process. If refueling or battery charging is to be carried out as a service, for example a corresponding charging connection/a fuel filler flap of the motor vehicle can be unlocked during parking, so that the service person can carry out the service. If mail delivery is to take place as a service, a trunk of the motor vehicle can be unlocked, for example; if maintenance is to be carried out, a bonnet of the motor vehicle can be unlocked as a door.

In some embodiments, with regard to the authentication process, it can specifically be provided that an object associated with the service and/or the service person is identified. For some services, it is expedient to identify an object associated to the service, for example to scan a bar code of a package to be delivered on the authentication device. If the service person has to authenticate themselves, since it can then be traced who performed the service and a further authentication process can be carried out when leaving the service space in order to be as sure as possible that the service person left the service space. The authentication device can be implemented in a very wide variety of ways, be it for reading out authentication information (bar code/code card and the like) or for other authentication processes, for example biometric measurements, the input of codes, and the like. If service-specific authentication information is required, it can also be ensured that only a person who is specifically assigned to the service receives access to the motor vehicle.

In some embodiments, using a sensor, in particular a camera, the activity of the service person within the service space is detected and in particular stored. Such a camera can also be used for detecting whether the service space is without any people in it when the motor vehicle drives in or whether there are actually no people in the service space when the motor vehicle is to be moved out of the service space again. However, such a camera expediently monitors the activity of the service person within the service space, so that the interaction of the person with the motor vehicle can be documented. Damage or the like can be tracked and assigned to special service persons/actions. The evaluation and/or storage of sensor data from the sensor, in particular the camera, can in turn preferably be carried out by the control device assigned to the parking environment, which also coordinates the operation of the motor vehicles in the parking environment.

In some embodiments, a service environment, comprising a service space outside a parking environment having fully automatically operated motor vehicles parked on parking spaces, wherein the service space has a parking-environment-side access gate and a staff access that can be accessed from outside the parking environment, and wherein the service environment further comprises: an authentication device and a control device located outside the service space, wherein by transmitting control information to a motor vehicle provided for a service and controlling the entrance gate and the staff access, the control device is designed to carry out the method according to the invention. All statements relating to the method according to various embodiments, as described herein, can be transferred analogously to the service environment. In particular, the service space can comprise at least one service device that can be used to perform the service and/or at least one sensor, in particular a camera.

Further advantages and details of the present disclosure will become apparent from the embodiments described below with reference to the drawings.

FIG. 1 illustrates a schematic diagram of a parking environment with a service environment, in accordance with some embodiments. A parking environment 1 designed, for example, as a parking garage in which autonomous valet parking (AVP) is implemented, which, as shown in section 2, provides a plurality of parking spaces 3 for motor vehicles 4. Since the processes of entering and leaving the parking space are to take place by fully automated operation of the motor vehicles 4 equipped with a corresponding vehicle guidance system and the parking environment 1 is blocked for people, the operation of the motor vehicles 4 in the parking environment 1 is coordinated by a central control device 5 assigned to the parking environment 1.

At least one transfer region 6 is assigned to the parking environment 1 outside the parking environment that cannot be accessed for the transfer and pick-up of motor vehicles 4. If a motor vehicle 4 is to be parked, the driver can park it in the transfer region 6 and register the motor vehicle 4 accordingly with the control device 5, for example he can buy a parking ticket or the like. Corresponding terminals at the transfer region 6 and/or a driver's mobile device can be used for this purpose. When picking up the motor vehicle 4, terminals and/or mobile devices of the respective drivers can again be used to generate a parking request, for example after paying parking fees, so that the corresponding motor vehicle 4 can return to the respective transfer region 6.

In order to implement the autonomous operation of the motor vehicles 4 in the parking environment 1, the motor vehicles 4 communicate, for example via car2x communication, with the control device 5, which sends them control information that determines the autonomous operation of the motor vehicle 4. The control information can contain, for example, a digital map of the parking environment, a destination parking space/destination transfer region, and/or time intervals for driving on specific sections. The control information is implemented by the corresponding vehicle guidance systems of motor vehicles 4, as is generally known, in order to park and unpark autonomously.

To form a service environment of the type according to some embodiments, as described in this disclosure, a service space 7 is also connected to the parking environment 1, which has a lockable access gate 8 to the parking environment 1 and has a staff access 9 to the outside of the parking environment 1. The staff access 9 can also be locked.

Figure 2:
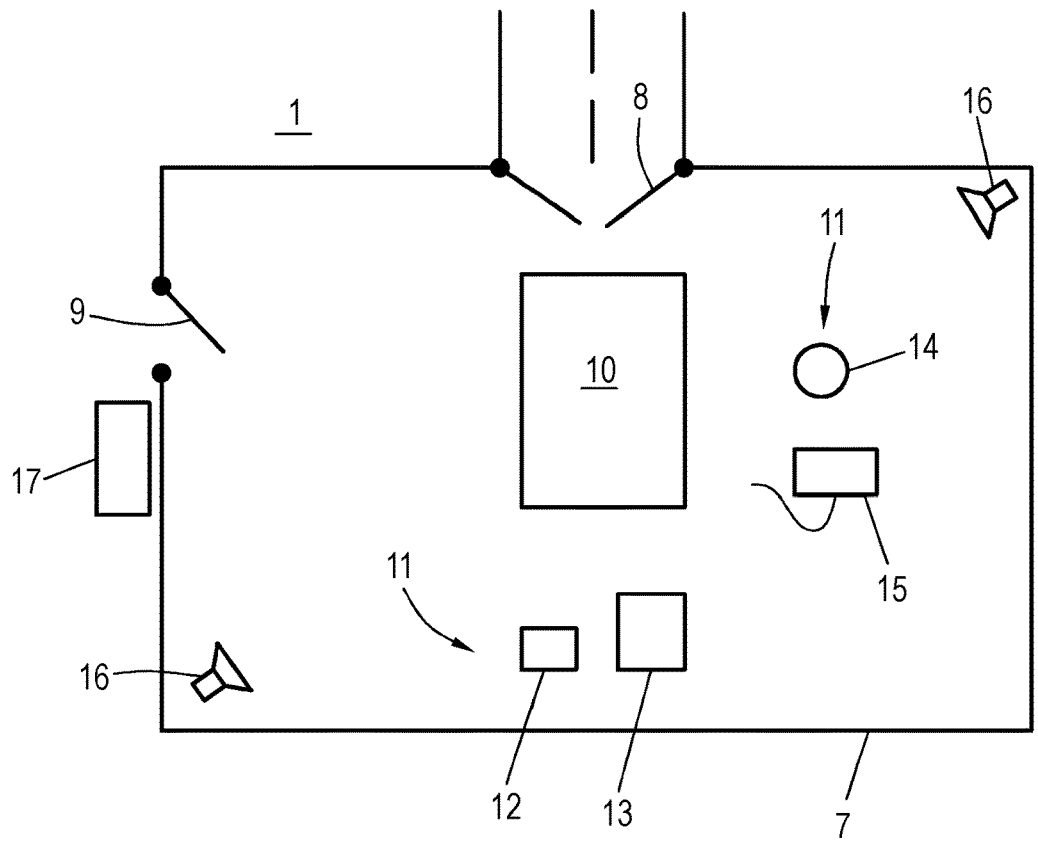
FIG. 2 illustrates a detailed view of a service space, in accordance with some embodiments.

FIG. 2 illustrates a detailed view of a service space, in accordance with some embodiments. FIG. 2 shows the service space 7 again in more detail. The service space 7 accordingly comprises a parking opportunity 10 for a motor vehicle 4, on which a service can be performed on the motor vehicle 4. To implement various services, service devices 11 are provided in the service space 7, in the present case comprising a fuel dispenser 12 for fuel, a charging station 13 for charging a battery of a motor vehicle 4, a water connection 14 for exterior cleaning, and a vacuum cleaner 15 for interior cleaning.

To monitor the interior of the service space 7, cameras 16 are also provided within the service space as sensors, which deliver the sensor data thereof to the control device 5.

An authentication device 17 is placed adjacent to the staff access 9 and can have at least one authentication means for authenticating a person and/or an object associated with a service. A bar code reader for reading out a bar code of a package to be delivered and/or an authentication card of a service person, biometric devices, and the like can be used as authentication means, for example. The authentication device 17 also communicates with the control device 5 and thus functions as a front end.

In some embodiments, the authentication device 17 does not necessarily have to be provided by a permanently installed terminal that can be used by different people, but in other embodiments it is also conceivable to use the authentication device on a mobile device using a corresponding application (app) by service personnel. The mobile device then communicates with the control device 5 accordingly in order to transmit authentication information when the service person requests or has just left the service space 7. An authentication device 17 installed permanently outside the service space 7 is that when it is used, it is ensured that the user is outside the service space 7, as will be explained in more detail below. A distributed configuration of the authentication device 17 is conceivable, for example, so that, for example, authentication information is generated by the service person's mobile device, but the service person must nevertheless perform an operating action on a permanently installed portion of the authentication device 17.

Figure 3:
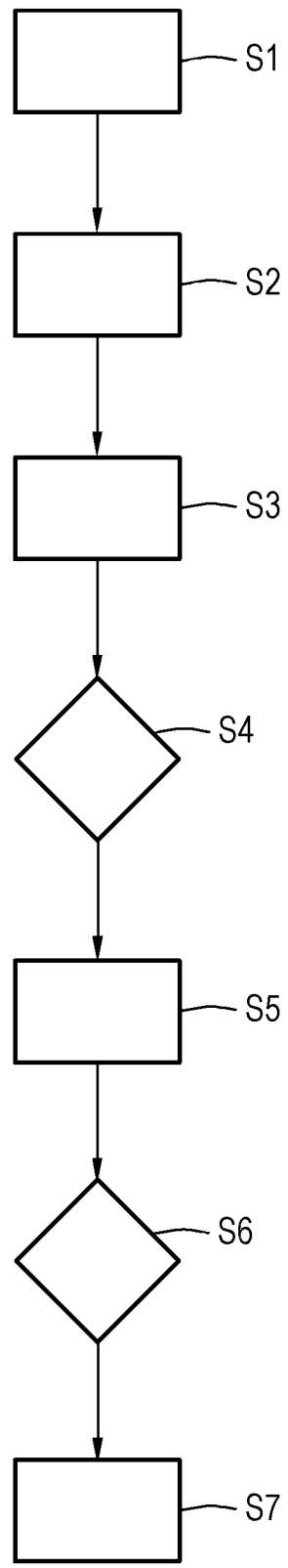
FIG. 3 illustrates a flow chart of an embodiment of a method, in accordance with some embodiments.

FIG. 3 illustrates a flow chart of an embodiment of a method, in accordance with some embodiments. The flow chart of an embodiment of the present invention in FIG. 3 shows how a service can be implemented under high security standards by means of the service environment.

The control device 5 coordinates the use of the service space 7 for a plurality of motor vehicles 4 for which services requiring a service person are to be carried out, so that the sequence shown in FIG. 3, which relates to a specific motor vehicle 4, can be repeated for different motor vehicles 4 according to a schedule. The schedule can be generated on the basis of request information for motor vehicles 4 and priority information, which can depend on a predicted response time. It should be pointed out that it is of course possible to assign a plurality of service spaces 7 to a parking environment 1.

In a step S1, the control device 5 controls the staff access 9 and the authentication device 17, if necessary after a further check as to whether the service space 7 is without any people in it, until further notice that no access to the service space 7 is permitted. The motor vehicle 4, for which the service is to be performed, receives control information from the control device 5 and is operated in a fully automated manner, and therefore autonomously, by means of its vehicle guidance system in order to drive to the service space 7, the access gate 8 of which is opened by controlling the control device 5, in particular then when the motor vehicle 4 approaches it.

In a step S2, the motor vehicle 4 is parked in the parking region 10. The control device 5 transmits control information to the parked motor vehicle 4, which describes at least one blocking of the fully automated operation. In addition, depending on the service, the control information can also include that a specific access to the parked motor vehicle 4 is made possible by unlocking in order to carry out the service. For example, a fuel filler flap can be unlocked for a refueling operation, the doors to the interior of the parked motor vehicle 4 can be unlocked for an interior cleaning operation, and/or the bonnet can be unlocked for a maintenance operation. The parked motor vehicle 4 confirms to the control device 5 in a step S3 that the fully automated operation is initially blocked. If not already done in step S2 after the parked motor vehicle 4 has entered, the access gate 8 is closed and locked, and the authentication device 17 and the staff access 9, for example comprising an access door, are generally opened for access by service personnel.

In a step S4, it is checked whether valid authentication has been carried out with respect to a service person requesting access and the service to be performed. A corresponding authentication process can include identification of the service person as well as identification of an object required for the service, for example a package for mail delivery. As already explained, bar code readers, magnetic card readers, and the like can be used for this purpose.

If authentication is successful in step S4, the staff access 9 is unlocked and the service person can enter the service space 7.

In a step S5, the service person then carries out the desired service, wherein maximum security is provided since the motor vehicle 4 parked in the service space 7 is blocked for fully automated operation. During the execution of the service, the cameras 16 are active and monitor the interaction of the service person with the parked motor vehicle 4, wherein the corresponding sensor data, here as video, are stored in a storage device of the control device 5.

In a step S6, it is monitored whether the service person has left the service space 7 and whether this space is empty. For this purpose, sensor data of the cameras 16 are evaluated on the one hand, and on the other hand the service person has to authenticate again at the authentication device 17, which is located outside the service space 7. Then, it becomes clear that the service person must have left the space 7.

If it is detected that nobody is in the service space 7, the staff access 9 is closed again and possible entry is prevented despite authentication. The access gate 8 is opened and the motor vehicle 4 parked in the service space 7 receives control information from the control device 5 in step S7 in order to return to the parking environment left in step S1 or to a new parking space 3 of the parking environment 1, since the control information also allows again the fully automated operation of the motor vehicle 4.

The invention claimed is:

1. A method for providing a motor vehicle for a service, the motor vehicle comprising a vehicle guidance system configured for fully automated vehicle guidance and being parked in a parking space in a parking environment, wherein an access to the parking environment is blocked for people, the method comprising:
    providing a service space outside the parking environment, the service space comprising a parking-environment-side access gate and a staff access accessible from outside the parking environment;
    utilizing the vehicle guidance system, automatically driving the motor vehicle from the parking space via the parking environment into the service space without any people in the motor vehicle, and parking the motor vehicle in the service space;
    detecting the parking of the motor vehicle in the service space by a central control device;
    transmitting, by the central control device, first control information to the vehicle guidance system of the parked motor vehicle, the first control information configured to temporarily block autonomous driving of the motor vehicle; and
    closing the access gate and enabling an entry of a service person through the staff access depending on an authentication process carried out by the service person at an authentication device located outside the service space.

2. The method of claim 1, further comprising:
    detecting the service person leaving the service space after parking the motor vehicle in the service space based on a deregistration process at the authentication device;
    closing the staff access and opening the access gate;
    transmitting, by the central control device, second control information to the vehicle guidance system of the parked motor vehicle, the second control information configured to unblock autonomous driving of the motor vehicle; and
    driving the motor vehicle completely automatically using the vehicle guidance system through the access gate and the parking environment onto the parking space of the parking environment.

3. The method of claim 2, wherein the motor vehicle is operating in fully automated operation during parking in the service space.

4. The method of claim 1, further comprising:
coordinating a use of the service space by communicating with the motor vehicle being parked in the parking environment using the central control device of the parking environment.

5. The method of claim 1, wherein the service space includes at least one service device that is used to carry out the service.

6. The method of claim 5, wherein the at least one service device comprises at least one of a charging station, a fuel dispenser for refueling the motor vehicle, a water connection, and a vacuum cleaner.

7. The method of claim 1, wherein at least one door or at least one connection of the motor vehicle is unlocked when parking based on the service to be provided at the service space.

8. The method of claim 1, wherein an object assigned to the service to be provided at the service space or the service person is identified by the authentication process.

9. The method of claim 1, further comprising:
detecting an activity of the service person within the service space using a sensor.

10. The method of claim 9, wherein the sensor comprises a camera.

11. The method of claim 1, further comprising:
confirming to the central control device whenever the autonomous driving by the vehicle guidance system of the motor vehicle has been temporarily blocked.

12. A service environment, comprising:
a service space, outside a parking environment configured for parking at least one fully automatically operated motor vehicle parked on a parking space, wherein the service space comprises:
a parking-environment-side access gate, and
a staff access that can be accessed from outside the parking environment;
an authentication device located outside the service space; and
a central control device located outside the service space, wherein the central control device is configured to:
utilizing a vehicle guidance system, automatically drive the motor vehicle from the parking space via the parking environment into the service space without any people in the motor vehicle, and parking the motor vehicle in the service space,
detect the parking of the motor vehicle in the service space,
selectively command the vehicle guidance system of the motor vehicle to temporarily block or unblock autonomous driving of the motor vehicle,
close the access gate and enable an entry of a service person through the staff access depending on an authentication process carried out by the service person at the authentication device, and
selectively control access through the access gate and the staff access.

\* \* \* \* \*